(12) United States Patent  
Tanaka

(10) Patent No.: US 7,933,778 B2  
(45) Date of Patent: Apr. 26, 2011

(54) SERIAL TRANSMISSION SYSTEM, TRANSMISSION DEVICE, AND SERIAL TRANSMISSION METHOD

(75) Inventor: Katsumasa Tanaka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 983 days.

(21) Appl. No.: 11/763,205

(22) Filed: Jun. 14, 2007

(65) Prior Publication Data

US 2007/0299653 A1 Dec. 27, 2007

(30) Foreign Application Priority Data

Jun. 22, 2006 (JP) .................................. 2006-172351

(51) Int. Cl.
*G10L 21/00* (2006.01)

(52) U.S. Cl. ........................................ 704/500; 704/201

(58) Field of Classification Search .................. 704/201, 704/500–504

See application file for complete search history.

(56) References Cited

U.S. PATENT DOCUMENTS

| 2004/0252235 | A1* | 12/2004 | Ejima | 348/515 |
| 2005/0047447 | A1* | 3/2005 | Satoh et al. | 370/535 |
| 2007/0121008 | A1* | 5/2007 | Kanoh | 348/537 |

FOREIGN PATENT DOCUMENTS

JP 2004-147047 A 5/2004

* cited by examiner

*Primary Examiner* — Abul Azad

(74) *Attorney, Agent, or Firm* — Sughrue Mion, PLLC

(57) ABSTRACT

A serial transmission system has a transmission signal generator and a transmission signal receiver. The transmission signal generator generates a digital audio signal of multi-channel based on information of a sampling frequency, and serially transmits the information of the sampling frequency together with the digital audio signal. The transmission signal receiver serially receives the information of the sampling frequency and the digital audio signal from the transmission signal generator, and detects change in a transmission clock based on the information of the sampling frequency.

15 Claims, 5 Drawing Sheets

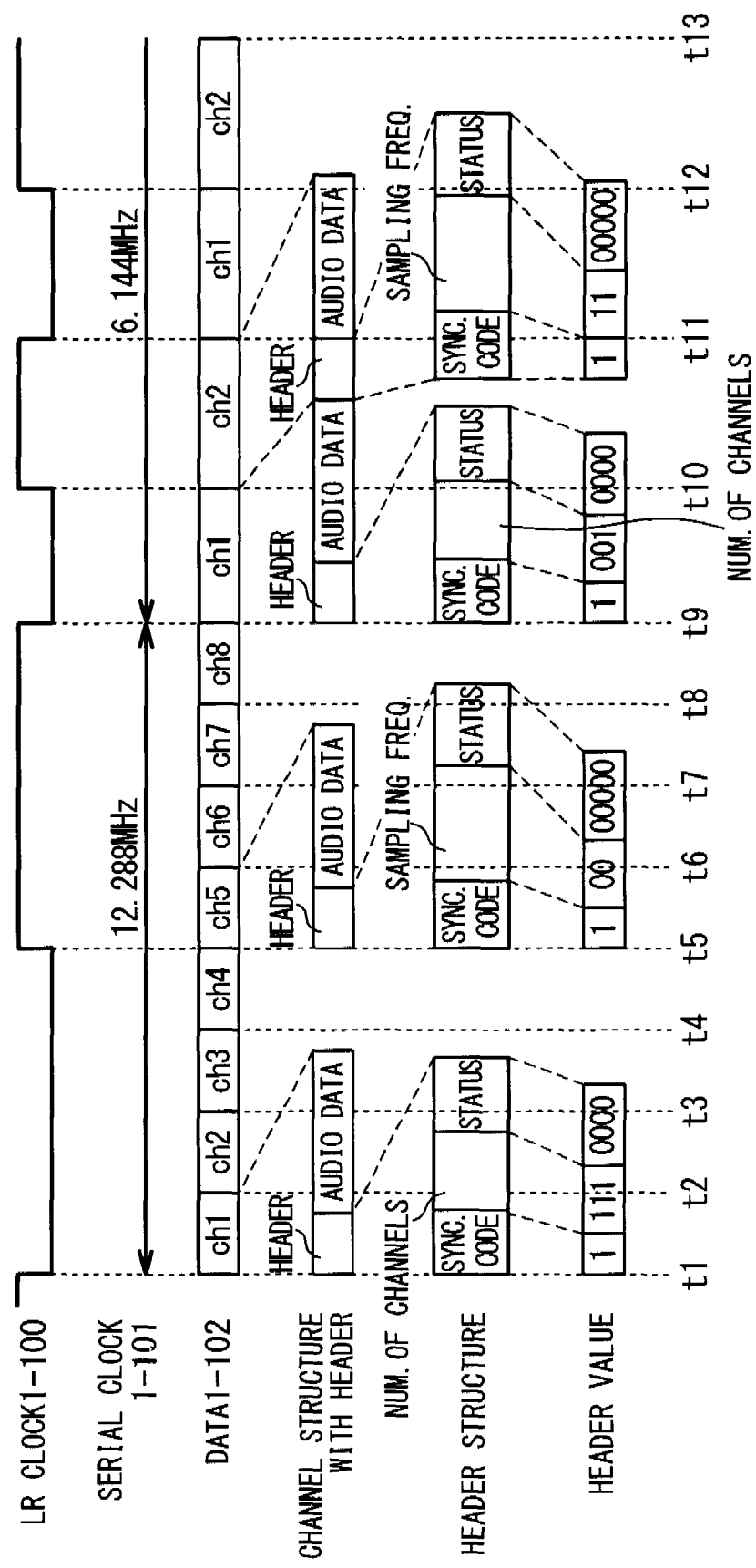

SERIAL TRANSMISSION SYSTEM, TRANSMISSION DEVICE, AND SERIAL TRANSMISSION METHOD

BACKGROUND OF THE INVENTION

1. Field of the Invention

The present invention relates to a serial transmission system. In particular, the present invention relates to a serial transmission system which transmits a digital audio signal via a serial transmission path.

2. Description of Related Art

In recent years, a digital audio technology has advanced conspicuously and a so-called multimedia device such as a DVD (Digital Versatile Disc) video and the like has come into wide use in household. Moreover, a multi-channel audio signal that uses more channels than the conventional two-channel stereo audio signal has come to be used as an application of the multimedia device. Accordingly, the number of transmission lines of the audio signal is increased and thus terminals of an LSI and the number of interconnections formed on a substrate are also increased. In a case of a general serial transmission, for example, the two-channel audio signal is transmitted by a total of three signals: a transmission clock, an LR clock for distinguishing between the left channel and the right channel of the two-channel stereo audio signal, and data. In order to transmit a six-channel audio signal by the same method, additional two signals are required and a total of five interconnections are necessary.

Furthermore, as the number of types of recording media such as the DVD, a CD (Compact Disc) and the like increases and a digital broadcasting becomes common, a plurality of sampling frequencies of the audio signal have come to be used. However, this causes a long silence period at a time when the sampling frequency is changed and a partial sound vanish after the sampling frequency is changed.

Both of the frequency of 48 kHz used by the DVD video and the frequency of 44.1 kHz used by the CD are the primary sampling frequencies, and many existing audio signals employ the two frequencies.

It is therefore necessary, for example, to transmit an audio signal whose sampling frequency is 48 kHz and then transmit an audio signal whose sampling frequency is 44.1 kHz by using the same transmission path.

In this case, it is necessary to once stop the transmission of the sampling frequency of 48 kHz, initialize a transmission device, a receiving device and the transmission path, change the setting to that of the sampling frequency of 44.1 kHz, and thereafter start the transmission of the sampling frequency of 44.1 kHz. Therefore, the silence occurs during a period from the stop of the transmission to the start of the next transmission, because the audio signal can not be transmitted. In addition, the sampling frequencies of 48 kHz and 32 kHz are mainly used in the digital broadcasting. For example, let us consider a case where the audio signal changes in the sampling frequency from 48 kHz to 32 kHz. In this case, if the audio signal whose sampling frequency is 32 kHz is transmitted after the transmission device, the receiving device and the transmission path are initialized, the head of the audio signal of the sampling frequency of 32 kHz may not be output, because it takes a long time for initializing the transmission path and hence the head does not make it in time for the output.

As a related technique, Japanese Laid-Open Patent Application JP-P2004-147047 discloses a serial transmission device which transmits a multi-channel audio signal. The audio data transmission system disclosed in the patent document is provided with an audio processing chip and a processor. The audio processing chip receives audio data of a plurality of channels and serially outputs the received audio data with respect to each channel. The processor performs signal processing of the audio data transmitted from the audio processing chip. The audio processing chip includes a synchronization signal generation unit which generates a synchronization signal maintaining a first logic level for a predetermined length depending on a channel number of the audio data to be transmitted to the processor. The processor is characterized by including a channel determination unit which measures the length for which the synchronization signal output from the synchronization signal generation unit is maintained at the first logic level to determine the channel number of the audio data.

FIG. 1 is a timing chart showing an operation of the transmission device, the serial transmission path and the receiving device according to the related technique. Shown in FIG. 1 are an operation clock signal (CLK) 5-100, a data line signal (DATA) 5-102, and a synchronization signal (SYNC) 5-101 indicating a synchronization timing of data input-output time of the DATA 5-102 and a selected channel. As shown in FIG. 1, the transmission device reflects the channel number to a pulse width of the SYNC 5-101 from timing (a). That is to say, the SYNC 5-101 has a pulse width of one clock at a time when the data of a channel-1 is transmitted and has a pulse width of four clocks at a time when the data of a channel-4 is transmitted. The receiving device recognizes the SYNC 5-101 to identify the channel number and then receives the DATA 5-102 from timing (b).

According to the configuration, it is possible to increase the number of channels of the data by increasing choices of the pulse width of the SYNC 5-101. Therefore, there is no need to increase the transmission line in addition to the three lines the CLK 5-100, the SYNC 5-101 and the DATA 5-102, which can solve the problem of the increase in the number of interconnections. However, there is no means for transmitting the sampling frequency, and thus only the audio data of a predetermined fixed frequency can be transmitted between the transmission device and the receiving device. In other words, if the audio signals of different sampling frequencies are to be transmitted, the silence period occurs and a synchronization relation between an image and the audio is broken.

The inventor of the present application has recognized the following point. In the above-described serial transmission, the sampling frequency that is an important attribute of the digital audio signal is not transmitted concurrently with the multi-channel audio signal. As a result, the long silence period and the phenomenon that the head of the audio signal can not make it in time for the output are caused.

SUMMARY

In one embodiment of the present invention, a serial transmission system has a transmission signal generator and a transmission signal receiver. The transmission signal generator generates a digital audio signal of multi-channel based on information of a sampling frequency, and serially transmits the information of the sampling frequency together with the digital audio signal. The transmission signal receiver serially receives the information of the sampling frequency and the digital audio signal from the transmission signal generator, and detects change in a transmission clock based on the information of the sampling frequency.

According to the present serial transmission system, a transmission data includes the sampling frequency and the number of transmission channels that are attributes of audio data, and the transmission clock is changed depending on the sampling frequency and the number of transmission channels. Consequently, it is possible to transmit the multi-channel audio signal without increasing the number of signal lines and to achieve the transmission without generating the silence period around when the sampling frequency is changed.

The first effect is that the multi-channel signal can be transmitted without increasing the number of transmission lines. The reason is that audio signals of a plurality of channels are combined and transmitted.

The second effect is that the silence period does not occur at the time when the sampling frequency of the audio signal is switched and thus the seamless transmission can be achieved. The reason is that the information of the sampling frequency, which has not been transmitted conventionally, is combined with the audio signal and transmitted concurrently with the audio signal, and the receiving device outputs sounds by correctly applying the sampling frequency of the audio signal.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a timing chart showing an example of serial transmission according to the embodiment of the present invention.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
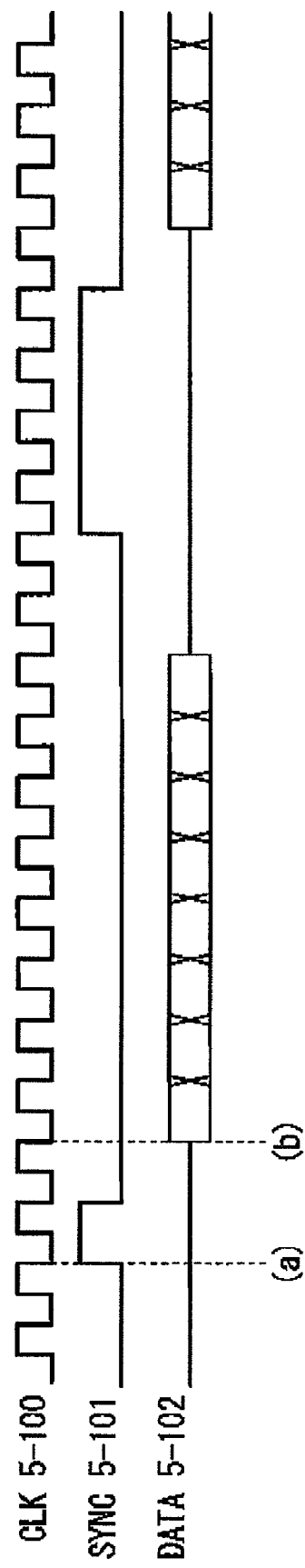
FIG. 1 is a timing chart showing an operation of a transmission device, a serial transmission path and a receiving device according to a related technique.
Figure 2:
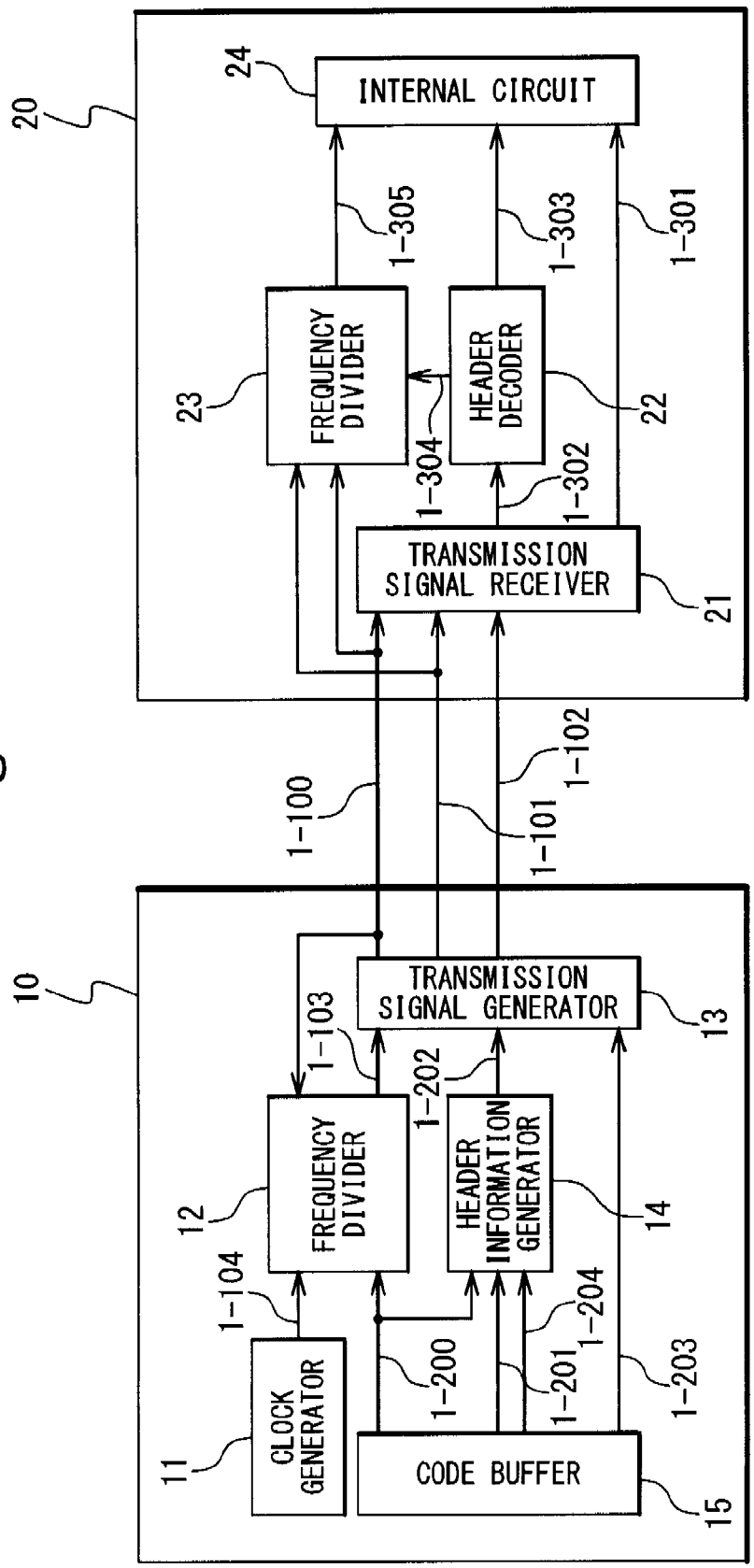
FIG. 2 is a block diagram showing a configuration of a serial transmission system according to an embodiment of the present invention.

FIG. 2 is a block diagram showing a configuration of a serial transmission system according to a first embodiment of the present invention. The serial transmission system of a digital audio signal according to the present embodiment includes a transmission device 10 and a receiving device 20.

The transmission device 10 is provided with a clock generator (master clock generator) 11, a frequency divider 12, a transmission signal generator 13, a header information generator 14 and a code buffer 15. The clock generator 11 generates a clock signal 1-104 (master clock signal). The frequency divider 12 frequency-divides the clock signal 1-104 in accordance with sampling frequency information 1-200 indicating a sampling frequency, to generate an audio clock 1-103. Also, the frequency divider 12 changes a frequency division ratio in synchronization with a time when an LR clock 1-100 changes from a High level (H) to a Low level (L). The transmission signal generator 13 obtains an audio data 1-203 from the code buffer 15, a header 1-202 from the header information generator 14, and the audio clock 1-103 from the frequency divider 12, respectively, to generate the LR clock 1-100, a serial clock 1-101 and data 1-102 (digital audio signal). The header information generator 14 obtains the sampling frequency information 1-200, channel information 1-201 indicating the number of channels, and status 1-204 from the code buffer 15, to generate the header 1-202. The code buffer 15 provides the sampling frequency information 1-200, the channel information 1-201, the audio data 1-203 and the status 1-204.

The receiving device 20 is provided with a transmission signal receiver 21, a header decoder 22 and a frequency divider 23. The transmission signal receiver 21 obtains the LR clock 1-100, the serial clock 1-101 and the data 1-102, to generate an audio data 1-301 and a header 1-302. The header decoder 22 obtains and decodes the header 1-302, to generate header information 1-303 and sampling frequency information 1-304. The frequency divider 23 obtains the LR clock 1-100, the serial clock 1-101 and the sampling frequency information 1-304, to generate a frequency division clock 1-305. An internal circuit 24 in the receiving device 20 shown in FIG. 2 obtains the audio data 1-301, the header information 1-303 and the frequency division clock 1-305.

Figure 3:
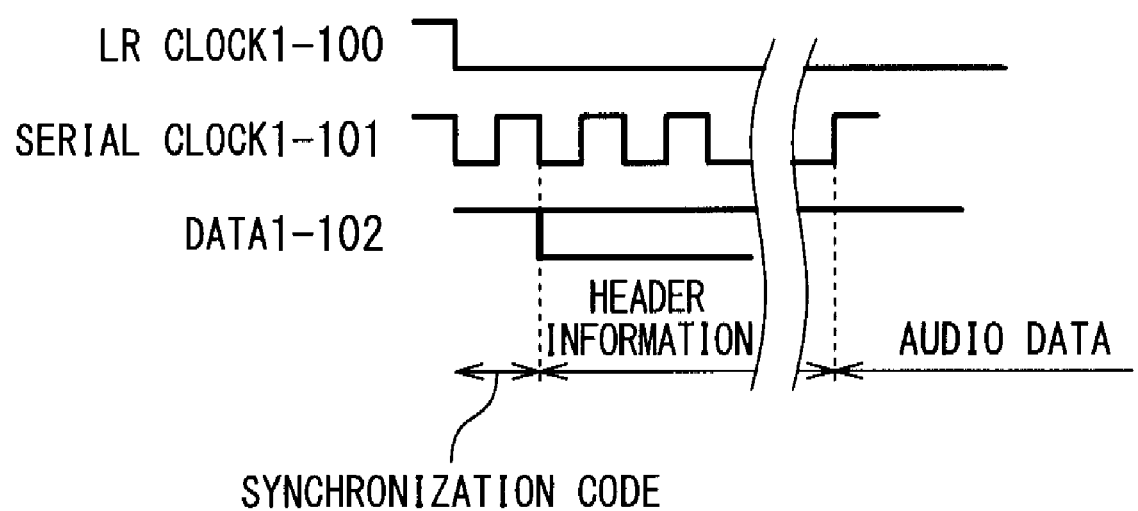
FIG. 3 is a drawing showing waveforms in the embodiment of the present invention.

FIG. 3 is a drawing showing waveforms in the present embodiment. The data 1-102 is transmitted in synchronization with the LR clock 1-100 and the serial clock 1-101 (transmission clock). The LR clock 1-100 changes between the Low level (L) and the High level (H) in synchronization with a synchronization code. The serial clock 1-101 changes between the Low level (L) and the High level (H) in synchronization with respective bits of the data 1-102.

Figure 4:
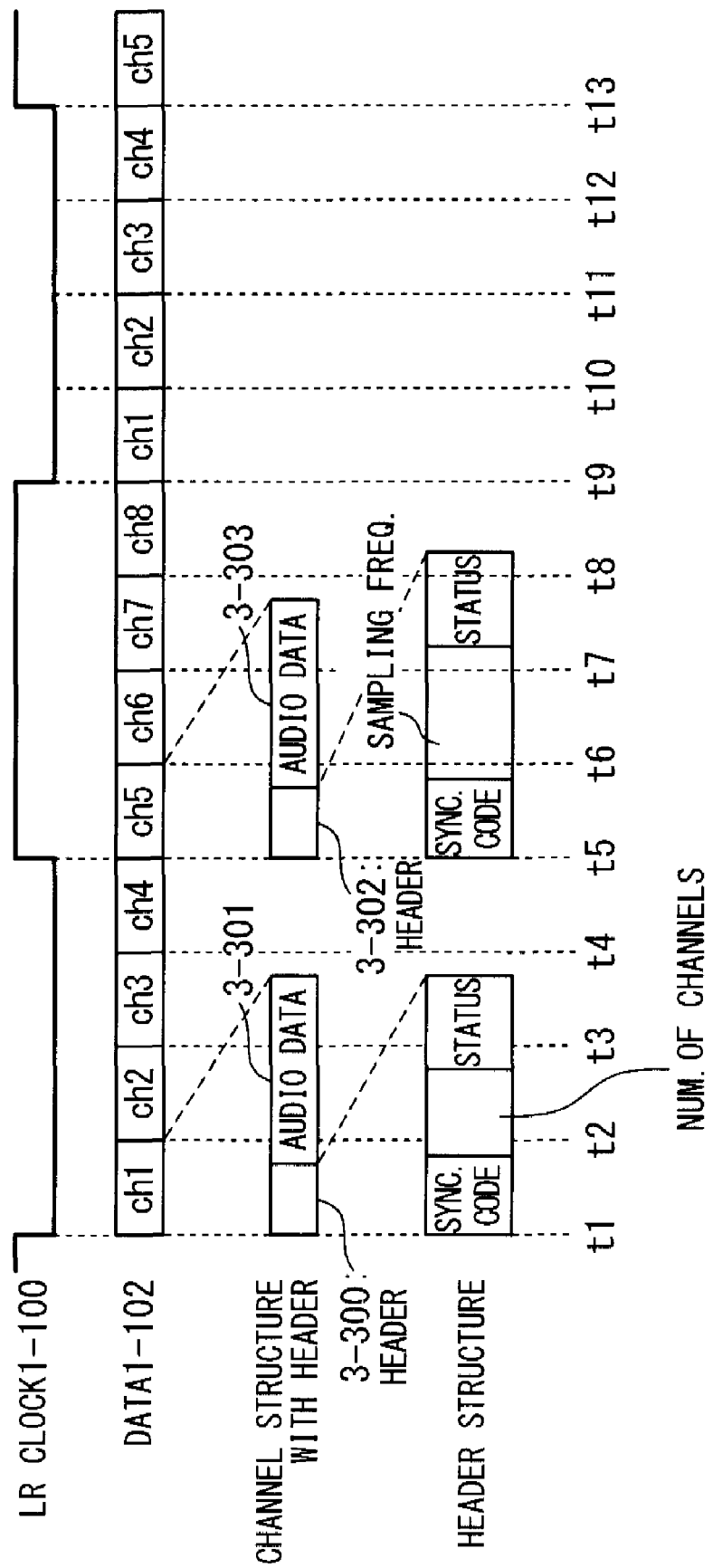
FIG. 4 is a timing chart for explaining a serial transmission method according to the embodiment of the present invention.

FIG. 4 is a timing chart for explaining a serial transmission method according to the present embodiment. In the present example, transmission of 8-channel audio data will be described. At a time t1, a part of the header 1-202 and audio data of a channel-1 of the audio data 1-203 are transmitted together. As shown in FIG. 4, a channel structure at this time includes a header structure 3-300 and an audio data structure 3-301. The header structure 3-300 includes the synchronization code, the number of channels (channel information 1-201) and a part of the status 1-204.

At a time t2, audio data of a channel-2 of the audio data 1-203 is transmitted. At a time t3, audio data of a channel-3 of the audio data 1-203 is transmitted. At a time t4, audio data of a channel-4 of the audio data 1-203 is transmitted.

At a time t5, the LR clock 1-100 changes from the Low level (L) to the High level (H), and the remaining part of the header 1-202 and audio data of a channels of the audio data 1-203 are transmitted together. As shown in FIG. 4, the channel structure at this time includes a header structure 3-302 and an audio data structure 3-303. The header structure 3-302 includes the synchronization code, the sampling frequency information 1-200 and a part of the status 1-204.

At a time t6, audio data of a channel-6 of the audio data 1-203 is transmitted. At a time t7, audio data of a channel-7 of the audio data 1-203 is transmitted. At a time t8, audio data of a channel-8 of the audio data 1-203 is transmitted.

It should be noted that the headers transmitted at the time t1 and the time t5 are supplementary information associated with the audio data transmitted during one cycle of the LR clock 1-100.

Next, after a time t9, data next to the audio data transmitted from the time t1 to the time t8 is transmitted.

At the time t9, the LR clock 1-100 changes from the High level (H) to the Low level (L), and a part of the header 1-202 and audio data of the channel-1 of the audio data 1-203 are transmitted together. Similarly, the header includes the synchronization code, the number of channels and a part of the status. If the number of channels transmitted at the time t9 is different from that transmitted at the foregoing time t1, the header decoder 22 notifies the frequency divider 23 and the internal circuit 24 of the fact that the number of channels is changed at the time t9 and transmits the number of channels after the change to the frequency divider 23 and the internal circuit 24.

At a time t10, audio data of the channel-2 of the audio data 1-203 is transmitted. At a time t11, audio data of the channel-3 of the audio data 1-203 is transmitted. At a time t12, audio data of the channel-4 of the audio data 1-203 is transmitted.

At a time t13, the LR clock 1-100 changes from the Low level (L) to the High level (H), and the remaining part of the header 1-202 and audio data of the channel-5 of the audio data 1-203 are transmitted together. Similarly, the header includes the synchronization code, the sampling frequency information 1-200 and a part of the status.

If the sampling frequency information transmitted at the time t13 is different from that transmitted at the foregoing time t5, the header decoder 22 notifies the frequency divider 23 and the internal circuit 24 of the fact that the sampling frequency is changed at the time t13 and transmits the sampling frequency after the change to the frequency divider 23 and the internal circuit 24.

An example of the method of dynamically switching the sampling frequency and the number of channels will be described below. FIG. 5 is a timing chart showing an example of the serial transmission. The description will be given below with reference to FIG. 5.

In the present example, eight-channel audio data of the sampling frequency of 48 kHz is first transmitted, and then two-channel audio data of the sampling frequency of 96 kHz is transmitted.

According to the present embodiment, the header that is information indicating the configuration of the audio data is combined with the audio data and transmitted concurrently with the audio data. The header can include the synchronization code of 1 bit, the channel information (the number of channels) of 3 bits, the sampling frequency information of 2 bits and the status of 9 bits. Header factors, the numbers of bits of the respective header factors, and meanings of values of the respective header factors are shown in the following TABLE. 1. The status is an area in which the other supplementary information of the audio data is indicated, and data 0 of 9 bits ("000000000") is transmitted in the present example.

TABLE 1

| HEADER FACTOR | NUM. OF BITS | VALUE | |
|---|---|---|---|
| SYNC. CODE | 1 bit | | 1 |
| NUM. OF CHANNELS | 3 bit | 000 | 1ch |
| | | 001 | 2ch |
| | | 010 | UNUSED |
| | | 011 | 4ch |
| | | 100 | UNUSED |
| | | 101 | UNUSED |
| | | 110 | UNUSED |
| | | 111 | 8ch |
| SAMPLING FREQ. | 2 bit | 00 | 48 kHz |
| | | 01 | UNUSED |
| | | 10 | UNUSED |
| | | 11 | 96 kHz |
| STATUS | 9 bit | | 000000000 |

A part of the header (8 bits: the synchronization code (1 bit), the number of channels (3 bits) and a part of the status (4 bits)) is transmitted at a time t1, while the remaining part of the header (8 bits: the synchronization code (1 bit), the sampling frequency (2 bits) and the remaining part of the status (5 bits)) is transmitted at a time t5. In other words, the header has 16 bits in total and is transmitted 8 bits by 8 bits at the time t1 and the time t5, respectively. The audio data is a 24 bits data. Therefore, a total of 32 bits is transmitted at each of the time t1 and the time t5. At the other times, only the audio data of 24 bits is transmitted.

In the present example, the audio data of the sampling frequency of 48 kHz and the audio data of the sampling frequency of 96 kHz are transmitted. A clock frequency of the clock signal input to the frequency divider 12 is fixed at 49.152 MHz. Frequency division ratios in the frequency divider 12 are shown in the following TABLE. 2. The frequency division ratio is determined depending on the sampling frequency and the number of channels. The frequency division ratios in TABLE. 2 are designed considering that data of up to 32 bits is transmitted at a time.

TABLE 2

| | SAMPLING FREQ. | |
|---|---|---|
| NUM. OF CHANNELS | 48 kHz | 96 kHz |
| 1 | 32 DIVISION | 16 DIVISION |
| 2 | 16 DIVISION | 8 DIVISION |
| 4 | 8 DIVISION | 4 DIVISION |
| 8 | 4 DIVISION | 2 DIVISION |

Next, an operation will be explained. The transmission device 10 first transmits the eight-channel audio data of the sampling frequency of 48 kHz during a period from the time t1 to a time t8.

Here, with reference to TABLE. 2, the frequency division ratio of "4" is selected in the frequency divider 12, and hence the frequency of the serial clock 1-101 is set to one-fourth of 49.152 MHz, namely 12.288 MHz.

Since an interval between the times is equal to one-eighth of a period corresponding to 48 kHz, the number of bits of the serial data transferred at each time is 32 bits (12288/48/8=32). That is to say, the data of 32 bits is transferred at one time.

In the present example, the data of 32 bits is transmitted at each of the time t1 and the time t5. At the other time, however, it is enough to transmit only the audio data of 24 bits. Therefore, no information is transmitted by the remaining 8 bits. For example, the remaining 8 bits are filled with "0". In the present example, the 32-bit transmission is made possible in order to support the case where the supplementary information such as the sampling frequency or the like is transmitted concurrently with the audio data.

If the audio data can be divided, the audio data of 24 bits may be divided into three divisional data of 8 bits. In this case, a combination of the audio data of 24 bits and one divisional data of 8 bits may be transmitted at each of the other times (times t2, t3 and t4). Alternatively, three divisional data of 8 bits are created from each audio data of 24 bits, and four pieces (8 bits*4=32 bits) of divisional data may be transmitted at each of the other times (times t2, t3 and t4).

Moreover, the clock frequency may be changed at the other times (t2, t3 and t4) such that only 24-bit transmission is possible. In other words, the clock frequency is switched during one sample period. In the case when only the audio data is transmitted, the clock frequency is set such that only 24 bits can be transmitted. On the other hand, in the case when the supplementary information is transmitted together, the clock frequency is set such that 32 bits can be transmitted.

Next, the transmission device 10 transmits the two-channel audio data of the sampling frequency of 96 kHz after a time t9.

At the time t9, the sampling frequency is changed. That is to say, at the time t9 when the LR clock 1-100 changes from the High level (H) to the Low level (L), the frequency of the LR clock 1-100 changes from 48 kHz to 96 kHz.

Since the sampling frequency and the number of channels are changed, the frequency division ratio by the frequency divider 12 is changed. More specifically, the frequency division ratio is changed from "4" to "8" at the timing of t9.

As a result, the frequency of the serial clock 1-101 is changed from 12.288 MHz to 6.144 MHz at the timing of t9.

It can be understood by similar calculation as described above that the data of 32 bits can be transferred during half of a period corresponding to 96 kHz, in the case of the serial clock of 6.144 MHz.

The header transmitted at the time t9 includes the number of channels indicating "001 (2ch)". The header transmitted at a time t10 includes the sampling frequency indicating "11 (96 kHz)".

The receiving device 20 detects the channel information "111" that is the header factor transmitted at the time t1, and recognizes that the number of channels is 8. Also, the receiving device 20 detects the sampling frequency information "00" that is the header factor transmitted at the time t5, and recognizes that the sampling frequency is 48 kHz.

Therefore, the receiving device 20 receives the audio data which is transmitted by the transmission device 10 from the time t1 to the time t8 as the eight-channel audio signal of the sampling frequency of 48 kHz.

After that, the receiving device 20 detects the channel information "001" that is transmitted at the time t9, and recognizes that the number of channels is 2. Also, the receiving device 20 detects the sampling frequency information "11" that is transmitted at the time t10, and recognizes that the sampling frequency is 96 kHz. That is to say, based on the channel information and the sampling frequency information, the receiving device 20 detects that the audio data transmitted is changed from the eight-channel audio signal of the sampling frequency of 48 kHz to the two-channel audio signal of the sampling frequency of 96 kHz. Therefore, the receiving device 20 receives the audio data which is transmitted after the time t9 as the two-channel audio signal of the sampling frequency of 96 kHz. Around the time t9 when the sampling frequency and the number of channels are changed, it is not necessary to stop the operations of the transmission device, the receiving device and the transmission path. It is thus possible to transmit the audio data without interruption.

According to the present embodiment, as described above, it is possible to transmit the multi-channel audio data without increasing the number of transmission lines.

Furthermore, the transmission is not interrupted around the time when the sampling frequency and/or the number of channels are changed. Therefore, the problems that the silence period occurs and the synchronization relation between an image and the audio is broken can be solved.

Next, modified examples of the embodiment of the present invention will be explained below. In the foregoing embodiment of the present invention, the LR clock 1-100 changes from the High level (H) to the Low level (L) at the time t1, and changes from the Low level (L) to the High level (H) at the time t5. Another transmission method is also possible, in which the LR clock 1-100 changes from the Low level (L) to the High level (H) at the time t1, and changes from the High level (H) to the Low level (L) at the time t5.

Also, in the foregoing embodiment, the serial clock 1-101 changes from the High level (H) to the Low level (L) at the time in synchronization with respective bits of the audio data. Another transmission method is also possible, in which the serial clock 1-101 changes from the Low level (L) to the High level (H) at that timing.

The present invention can be applied, for example, to an audio recording and playing equipment such as a DVD recorder, a television to which digital codes can be input, and the like.

As described above, the digital audio signal serial transmission system according to the present embodiment has a serial interface circuit which transmits a data signal, a first clock signal and a second clock signal. The data signal includes a digital audio signal sampled based on a predetermined sampling frequency. The first clock signal changes between the Low level (L) and the High level (H) in synchronization with output times of respective bits of the data signal. The second clock signal changes between the Low level (L) and the High level (H) at the sampling frequency.

Moreover, the digital audio signal serial transmission system includes a first frequency divider, a second frequency divider, a change point detector, a header information generator and a transmission signal generator. A master clock generator generates a master clock signal whose frequency is an integer times the sampling frequency. The first frequency divider frequency-divides the master clock signal to generate the first clock signal. The second frequency divider frequency-divides the maser clock signal to generate the second clock signal. The change point detector detects a change point of the second clock signal to generate a first timing signal. The header information generator generates header information that includes at least the number of channels and the sampling frequency of the digital audio signal. In response to the first timing signal, the transmission signal generator generates a data signal by combining the header information and the digital audio signal and sets respective frequency division ratios in the first and the second frequency dividers.

It is apparent that the present invention is not limited to the above embodiments and may be modified and changed without departing from the scope and spirit of the invention.

What is claimed is:

1. A serial transmission system comprising:
a transmission signal generator configured to generate a digital audio signal of multi-channel based on information of a sampling frequency and to serially transmit said information of said sampling frequency together with said digital audio signal; and
a transmission signal receiver configured to serially receive said information of said sampling frequency and said digital audio signal from said transmission signal generator and to detect change in a transmission clock based on said information of said sampling frequency,
wherein said transmission signal generator changes a frequency division ratio in synchronization with a time when an LR clock signal, which changes between a Low level and a High level at said sampling frequency, changes between the levels.

2. The serial transmission system according to claim 1, wherein said transmission signal generator further serially transmits information of a number of channels together with said digital audio signal,
wherein said transmission signal receiver serially receives said information of said number of channels and said digital audio signal from said transmission signal generator and detects change in said transmission clock based on said information of said number of channels.

3. The serial transmission system according to claim 2,
wherein said transmission signal generator changes said transmission clock depending on said information of said sampling frequency and said information of said number of channels.

4. The serial transmission system according to claim 1,
wherein said transmission signal generator serially transmits said digital audio signal in synchronization with the LR clock signal.

5. The serial transmission system according to claim 1,
wherein said transmission signal generator serially transmits said digital audio signal in synchronization with a serial clock signal which changes between a Low level and a High level in synchronization with output times of respective bits of said digital audio signal.

6. A transmission device comprising:
a master clock generator configured to generate a master clock signal whose frequency is an integer times a sampling frequency;
a code buffer configured to provide information of said sampling frequency, a channel information and an audio data;
a frequency divider configured to frequency-divide said master clock signal based on said information of said sampling frequency to generate an audio clock signal;
a header information generator configured to receive said information of said sampling frequency and said channel information to generate a header; and
a transmission signal generator configured to receive said audio data, said header and said audio clock signal and to generate a data signal including a digital audio signal sampled based on said sampling frequency, an LR clock signal which changes between a Low level and a High level at said sampling frequency, and a serial clock signal which changes between a Low level and a High level in synchronization with output times of respective bits of said data signal,
wherein said frequency divider changes a frequency division ratio in synchronization with a time when said LR clock signal changes between levels.

7. The transmission device according to claim 6,
wherein said frequency divider changes a frequency division ratio in synchronization with a time when said LR clock signal changes from a High level to a Low level.

8. The transmission device according to claim 6,
wherein said frequency divider changes a frequency division ratio in synchronization with a time when said serial clock signal changes from a High level to a Low level.

9. The transmission device according to claim 6,
wherein said transmission signal generator changes a transmission clock depending on said information of said sampling frequency and said channel information.

10. The transmission device according to claim 6,
wherein said transmission signal generator transmits said data signal in synchronization with said LR clock signal and said serial clock signal,
wherein said LR clock signal changes between a Low level and a High level in synchronization with a synchronization code and said serial clock signal changes between a Low level and a High level in synchronization with respective bits of said data signal.

11. A serial transmission method comprising:
(a) transmitting a data signal including a digital audio signal sampled based on a sampling frequency, a first clock signal which changes between a Low level and a High level in synchronization with output times of respective bits of said data signal, and a second clock signal which changes between a Low level and a High level at said sampling frequency;
(b) generating a master clock signal whose frequency is an integer times said sampling frequency;
(c) generating said first clock signal by frequency-dividing said master clock signal;
(d) generating said second clock signal by frequency-dividing said master clock signal;
(e) detecting a change point of said second clock signal to generate a timing signal;
(f) generating a first header information including a number of channels and said sampling frequency of said digital audio signal;
(g) combining said first header information and said digital audio signal to generate said data signal and setting respective frequency division ratios of said master clock signal at times of generating said first clock signal and said second clock signal, in response to said timing signal,
wherein said (c) step includes: (c1) changing said frequency division ratio in synchronization with a time when said second clock signal changes levels.

12. The serial transmission method according to claim 11,
wherein said (c1) step includes: (c2) changing said frequency division ratio in synchronization with a time when said second clock signal changes from a High level to a Low level.

13. The serial transmission method according to claim 11,
wherein said (a) step includes: (a1) transmitting said data signal in synchronization with said first clock signal and said second clock signal,
wherein said second clock signal changes between a Low level and a High level in synchronization with a synchronization code and said first clock signal changes between a Low level and a High level in synchronization with respective bits of said data signal.

14. The serial transmission method according to claim 11,
wherein said (g) step includes: (g1) changing a transmission clock depending on said number of channels and said sampling frequency.

15. The serial transmission method according to claim 11, further comprising:
(h) receiving said data signal, said first clock signal and said second clock signal;
(i) obtaining said data signal, said first clock signal and said second clock signal to generate an audio data and supplementary information of said audio data;
(j) obtaining said supplementary information to generate a second header information and information of said sampling frequency; and
(k) obtaining said first clock signal, said second clock signal and said information of said sampling frequency to generate a frequency division clock.

* * * * *